United States Patent [19]
Matsumoto

[11] Patent Number: 5,734,357
[45] Date of Patent: Mar. 31, 1998

[54] VEHICULAR DISPLAY DEVICE ADJUSTING TO DRIVER'S POSITIONS

[75] Inventor: Tsuyoshi Matsumoto, Kawasaki, Japan

[73] Assignee: Fujitsu Limited, Kanagawa, Japan

[21] Appl. No.: 525,010

[22] Filed: Sep. 8, 1995

[30] Foreign Application Priority Data

Dec. 2, 1994  [JP]  Japan .................. 6-299819

[51] Int. Cl.⁶ .................................................. G09G 3/02
[52] U.S. Cl. ..................................... 345/7; 359/632
[58] Field of Search ...................... 345/7, 8, 9; 359/13, 359/630, 631; 348/113, 115

[56] References Cited

U.S. PATENT DOCUMENTS

| | | | |
|---|---|---|---|
| 4,831,366 | 5/1989 | Iino | 345/7 |
| 4,837,551 | 6/1989 | Iino | 345/7 |
| 4,961,625 | 10/1990 | Wood et al. | 359/630 |
| 4,962,998 | 10/1990 | Iino | 345/7 |
| 4,973,942 | 11/1990 | Iino | 345/7 |
| 5,028,912 | 7/1991 | Iino | 345/7 |
| 5,034,732 | 7/1991 | Iino | 345/7 |
| 5,305,012 | 4/1994 | Faris | 345/7 |
| 5,506,595 | 4/1996 | Fukano et al. | 345/7 |

*Primary Examiner*—Raymond J. Bayerl
*Assistant Examiner*—John Suraci
*Attorney, Agent, or Firm*—Nikaido, Marmelstein, Murray & Oram LLP

[57] ABSTRACT

A display device comprises an indicator for displaying informations concerning vehicles, a photographing unit for photographing a driver, an image processing unit for detecting a position of the driver from the pictures photographed by the photographing unit and an adjusting mechanism for adjusting an angle of reflecting means which reflects a display light emitted by the indicator on the basis of the position of the driver's eyes detected by the image processing unit.

8 Claims, 14 Drawing Sheets

VEHICULAR DISPLAY DEVICE ADJUSTING TO DRIVER'S POSITIONS

BACKGROUND OF THE INVENTION

The present invention relates to a display device for displaying informations concerning vehicles and the like by imaging the informations on a forward view of a driver.

When you drive a car, it is necessary to pay attention to measurement values of a speed, an engine speed, a fuel and the like. Generally, it is necessary to look at a forward sight and an indicator by turns while you are driving the car, since the above-mentioned measurement values are displayed on the indicator received in a dash board in front of the driver's seat. This fact is prone to make the driver's eyes fatiguing, and there is the possibility that it causes a unexpected accident due to being inattentive to the forward. In particular, the above-mentioned fear has been intensified due to high-speed vehicles, a complication of surrounding environment, an increase of amount of informations in car and an increase of aged drivers.

Accordingly, a display device which makes it possible to identify the measurement values necessary for driving the car while the driver is looking at the forward sight has been developed, so as to solve the above-mentioned problems. A Head-Up Display (HUD) and a distal-visual-point-instrument-panel are representative examples of the display device.

The head-up display is provided with a function for superimposing the informations required by the driver as a background or a forward sight in the forward view of the driver, and displaying the informations in a distant position from the driver. A movement of eyes and a focus adjustment of eyes are dwindled when the driver looks at the informations displayed by HUD, since the driver usually looks at the forward sight. Accordingly, the visibility of the informations will be improved, and the fatigue of the eyes can be reduced while the driver is driving the car.

FIG. 2 indicates a basic construction of HUD for the car. HUD comprises a combiner for superimposing informations in the forward sight and an optical unit for imaging the informations in the distant position. The combiner is a transparent element which reflects a light, and reflects a display light emitted from the optical unit to superimpose the informations in the forward sight of the driver. In a case of the car, the combiner is formed in one portion of a front window. Besides, a small-sized display element and the optical unit composed of magnifying optical systems for imaging the pictures displayed on the display element in the distant position are arranged within the dash board.

On the other hand, the distal visual point instrument panel is a display device for displaying the informations in the distant position from the driver in the same way as HUD (However, unlike HUD the informations are not superimposed in the forward sight.) The focus adjustment of the driver's eyes is dwindled when the driver identifies the informations averting his eyes from the forward sight once, since the informations are displayed in the distant position from the driver. Accordingly, the visibility of the informations will be improved, and the fatigue of the eyes can be reduced. A display source for displaying the informations and the optical unit composed of magnifying optical systems for superimposing the informations displayed on the display source in the distant position are arranged within the dash board.

By the way, it is necessary to miniaturize the optical unit when HUD and the distal visual point instrument panel are mounted on such vehicles as the car. The distance from the driver to the displayed image, the size of the displayed image, the range in which the displayed image can be observed (range of visibility) and the like exist as elements for determining the size of the optical unit.

In the above-mentioned display devices, the visibility is improved by displaying the informations in the distance position. It is necessary to magnify the displayed image to the size which is in proportion to the distance from the driver to the displayed image so as to keep the size of the displayed image, when the informations are displayed in the distant position. However, a problem that the optical unit is enlarged occurs when the distance from the driver to the displayed image is widened and the displayed image is magnified.

Besides, a problem that the size of the displayed image becomes smaller against the displayable area exists in HUD and the distal visual point instrument panel. An example of the distal visual point instrument panel is shown in FIG. 3. In FIG. 3, W indicates the range of visibility (the range in which the displayed image can be observed), and the displayed image has to be viewed from every position of the range. For this reason, an aperture whose height is H is required in the position of the instrument panel. The height of the displayed image becomes merely i against the height h of the range of display within the instrument panel, when the driver looks at the displayed image from the position of A in FIG. 3. Accordingly, the range of (h–i) will become a range which is not related to the display. A rate (h–i)/h of the range which is not related to the display is increased as the range of the display becomes more distant. Namely, a problem that the size of the displayed image becomes smaller outwardly and the amount of informations to be displayed is dwindled occurs.

SUMMARY OF THE INVENTION

A subject of the present invention is to provide a display device which can be easily mounted on the vehicle and whose range of information display is wide.

The display device of the present invention is constructed as follows so as to solve the above-mentioned subjects.

Namely, the display device which displays informations concerning vehicles by imaging the informations on a forward view of a driver comprises an indicator 1, a photographing unit 5, an image processing unit 7, reflecting means 3 and an adjusting mechanism 9.

(Indicator 1)

The indicator 1 displays informations concerning the vehicles. For instance, LCD, CRT and a plasma display can be used as the indicator 1.

(Photographing Unit 5)

The photographing device 5 photographs the driver.

(Image Processing Unit 7)

The image processing unit 7 detects a position of the driver from pictures photographed by the photographing unit 5.

(Adjusting Mechanism 9)

The adjusting mechanism 9 adjusts an angle of reflecting means 3 which reflects a display light emitted by the indicator 1 on the basis of the position of the driver detected by the image processing unit 7.

FIG. 4 is a diagram describing a role of the adjusting mechanism 9. First of all, the range in which the driver can identify the informations concerning vehicles will be limited to the area indicated by $W_c$ of FIG. 4 if the adjusting mechanism 9 is not installed, since the display device is miniaturized to be mounted on the vehicle and the size of the displayed image is limited. However, the range in which the driver can identify the informations concerning vehicles will be enlarged to the range of $W_u$ and $W_d$ of FIG. 4, if the adjusting mechanism 9 is installed.

According to the display device of the present invention, first of all, a display light for displaying the informations concerning vehicles is emitted from the indicator 1, and the display light is reflected by the reflecting means 3. At this moment, the angle of the reflecting means 3 is adjusted by the adjusting mechanism 9 on the basis of the position of the driver detected by the image processing unit 7.

DETAILED DESCRIPTION OF THE EMBODIMENTS

The concrete embodiments of the present invention will be described as follows.

(First Embodiment)

The first embodiment is an example in which the present invention is applied to the head-up display.

<Construction of the First Embodiment>

Figure 1:
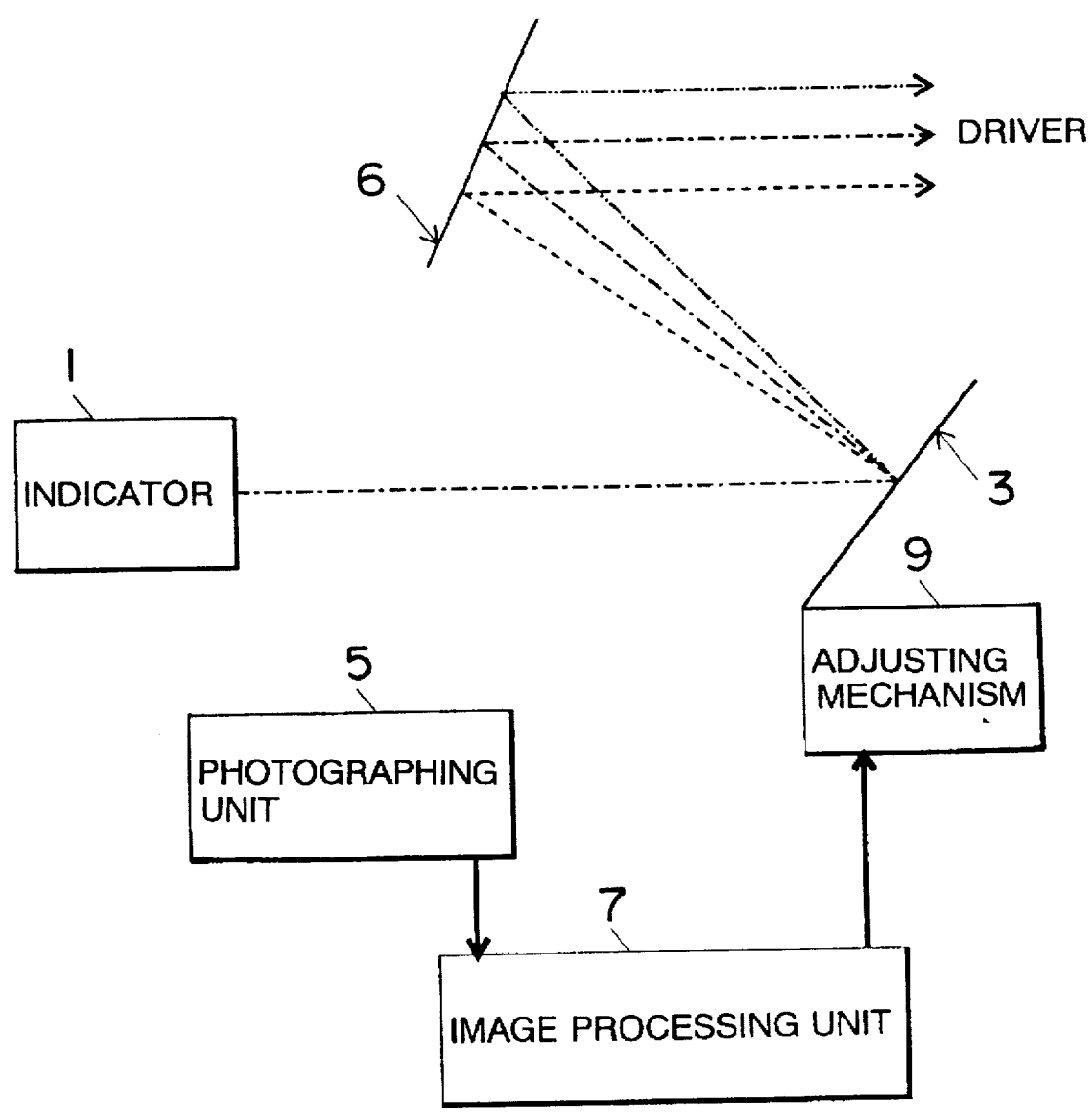
FIG. 1 is a principle diagram indicating a basic construction of a display device of the present invention.
Figure 2:
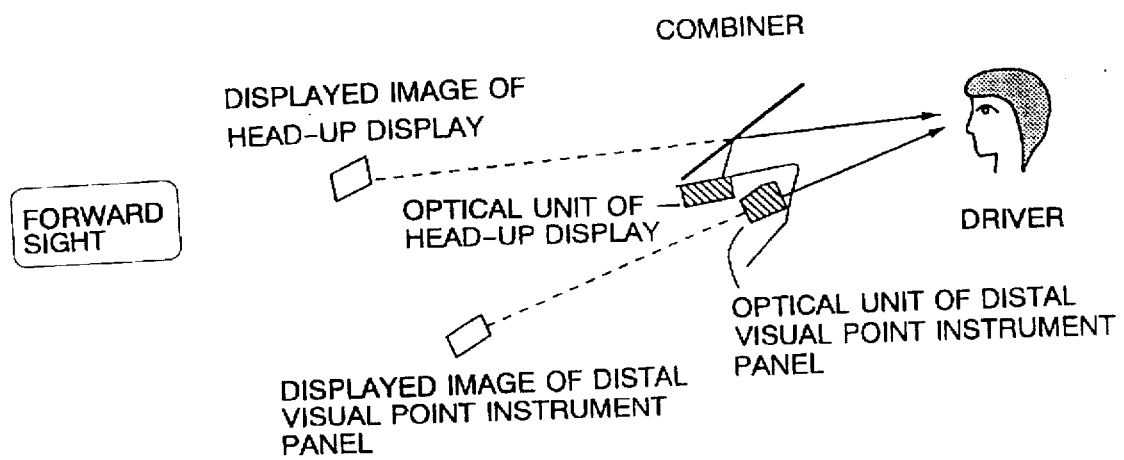
FIG. 2 is a diagram indicating a basic construction of a head-up display and a distal visual point instrument panel.
Figure 3:
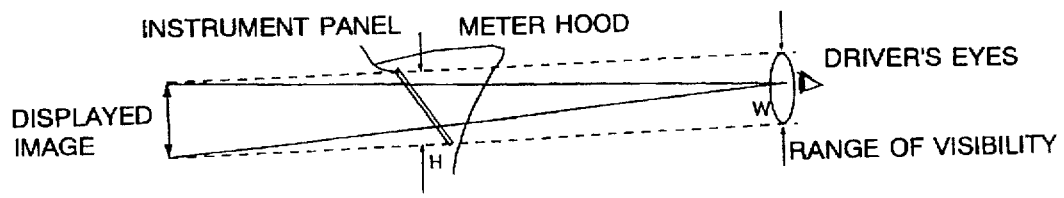
FIG. 3 is a diagram indicating a subject of prior art.
Figure 3:
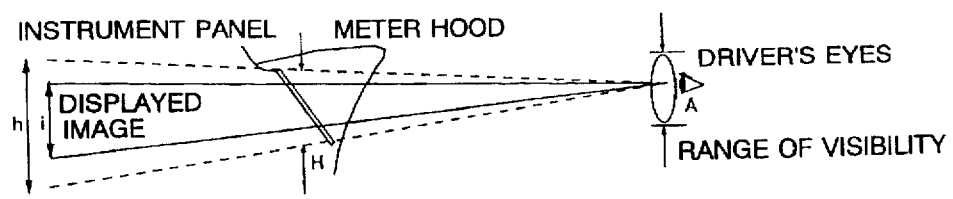
Figure 4:
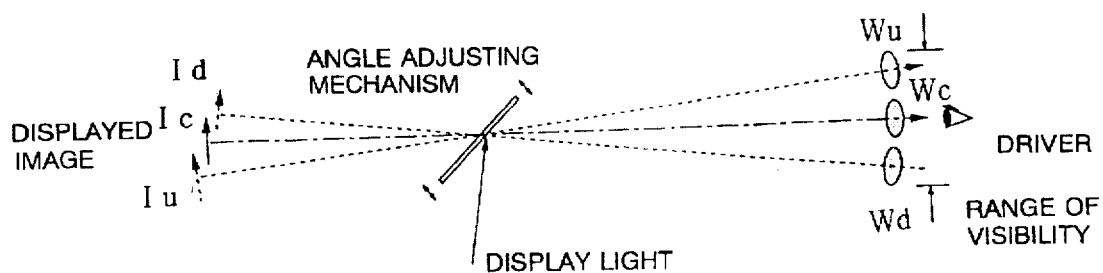
FIG. 4 is a diagram indicating a maintenance of range of visibility by an angle adjusting mechanism.
Figure 5:
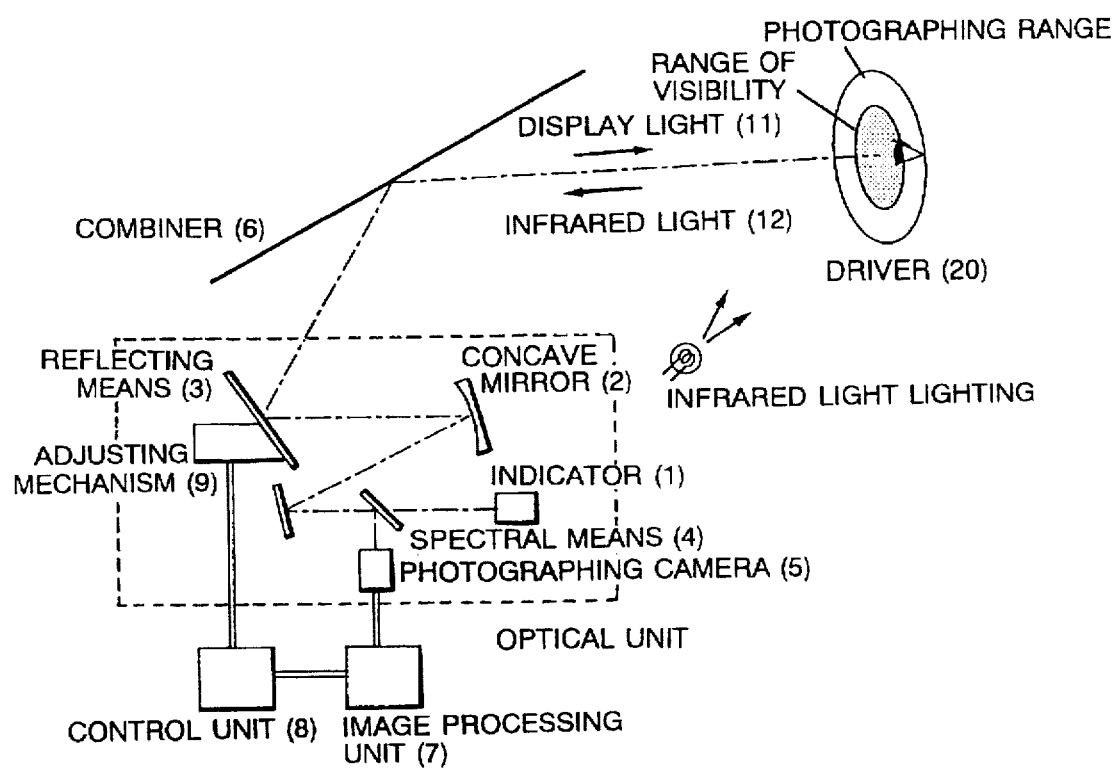
FIG. 5 is a construction diagram of the first embodiment.

FIG. 5 is a construction diagram of the first embodiment. As shown in FIG. 5, the present embodiment comprises an optical unit, a control unit 8 and an image processing unit 7.

An indicator 1 for displaying informations concerning vehicles, a concave mirror 2 for imaging displayed pictures in a position distant from an observer, reflecting means 3 which is capable of adjusting the direction of reflecting surface by an adjusting mechanism 9, a spectral means 4 for permeating a display light and reflecting an infrared light and a photographing camera 5 which is sensitive to the infrared light are arranged within the optical unit.

The display light 11 generated from the indicator 1 is radiated toward the combiner 6 through the spectral means 4, the concave mirror 2 and the reflecting means 3, and arrives at the driver 20 after being reflected by the combiner 6. The picture observed through the combiner 6 is imaged by the concave mirror 20 arranged within the optical unit in a position distant from the driver 20.

Hereupon, for instance, CRT, LCD and the plasma display can be used as the indicator 1.

Besides, for instance, a hologram, a half mirror, a multi-layer film mirror, a dichroic mirror and a polarizing plate can be used as the spectral means 4.

Further, the hologram, a metalized film and the like can be used as the combiner 6.

Furthermore, the reflecting means 3 only has to be able to adjust the outgoing direction of the light, namely, an element provided with functions of a concave mirror and a diffraction grating having an imaging characteristic and the like can be substituted for the reflecting means 3.

Besides, such elements as a diffraction grating and a hologram having an equal imaging characteristic as the concave mirror 2 can be substituted for the concave mirror 2.

Then, the spectral means 4 is arranged so that an optical axis of the photographing camera 5 and an optical axis of the display light 11 will be overlapped one another, and reflects the infrared light 12 which is reflected from the driver 20 and proceeds the same optical path as the display light 11 reversely to inject it into the photographing camera 5. Accordingly, the range in which the middle of the range of visibility is regarded as a center is photographed by the photographing camera 5. Besides, the photographing camera 5 is capable of photographing the range which is wider than the range of visibility, since the photographing camera 5 is arranged in the position where the optical path length from an outgoing entrance of the display light is shorter than the indicator 1.

The image processing unit 7 extracts a position of the eyes of the driver 20 from the pictures photographed by the photographing camera 5 to detect a deviation of the position from the center of the range of photographing (=the center of the range of visibility). Hereupon, for instance, a method according to what is called "pattern matching", and a method titled "An individual recognition according to time series picture processing" which was announced by Mr. So and Mr. Ozawa in the October, 1993 issue of "Shingakugiho" published by Institute of Electronics and Communication and Information can be used as the method for detecting the position of the driver's eyes. In the latter method, a lightness difference of parts of the eyes is binary-coded and an adequate threshold value is determined to extract a region of the parts of the eyes making use of a characteristic that only the eyes at the time of wink moves in the time series pictures. Further, a midpoint position of both eyes of the driver 20 is used as a position of the driver's eyes.

The control unit 8 controls the adjusting mechanism 9 on the basis of the deviation of position of the eyes and sets up the direction of the reflecting means 3 so that the driver's eyes will be in a position which is adjacent to the center of the photographed pictures. By these actions, the range of visibility can be directed to the position of eyes of the driver 20 automatically.

Figure 6:
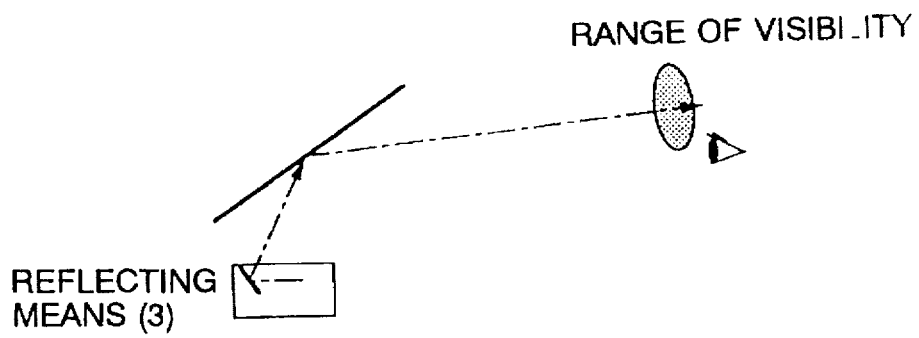
FIG. 6 is a diagram (1) indicating a case that the range of visibility is deviated upward.
Figure 7:
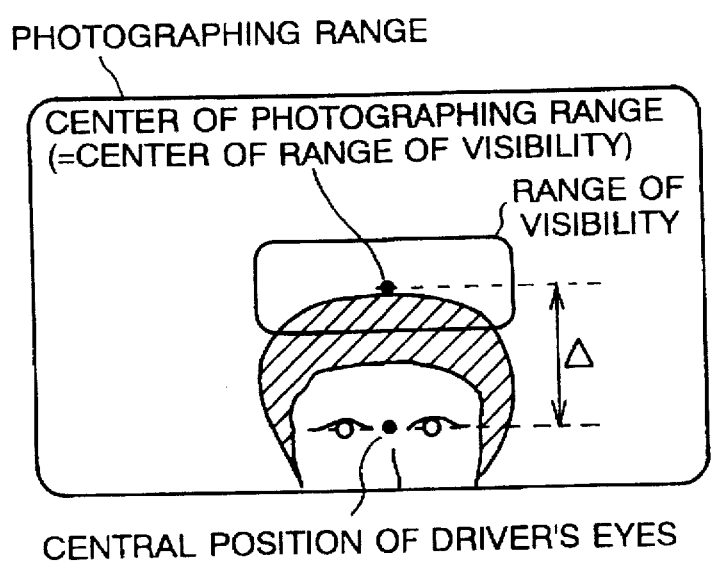
FIG. 7 is a diagram (2) indicating a case that the range of visibility is deviated upward.

For instance, as shown in FIG. 6, when the range of visibility is deviated upward from the eyes of the driver 20, namely, when the eyes of the driver 20 are positioned in the lower part of the range of visibility, the picture in which the eyes of the driver 20 are deviated downward is photographed by the photographing camera 5 arranged within the optical unit, as shown in FIG. 7. The image processing unit 7 detects the position of the eyes from the pictures photographed by the photographing camera 5 to extract a deviation A of the photographing range from the center.

Then, the control unit 8 controls the adjusting mechanism 9 in accordance with the size of the deviation Δ, and rotates the reflecting means 3 a little counterclockwise in FIG. 6. By these actions, the range of visibility will be adjusted to the position of the eyes of the driver 20.

Figure 8A:
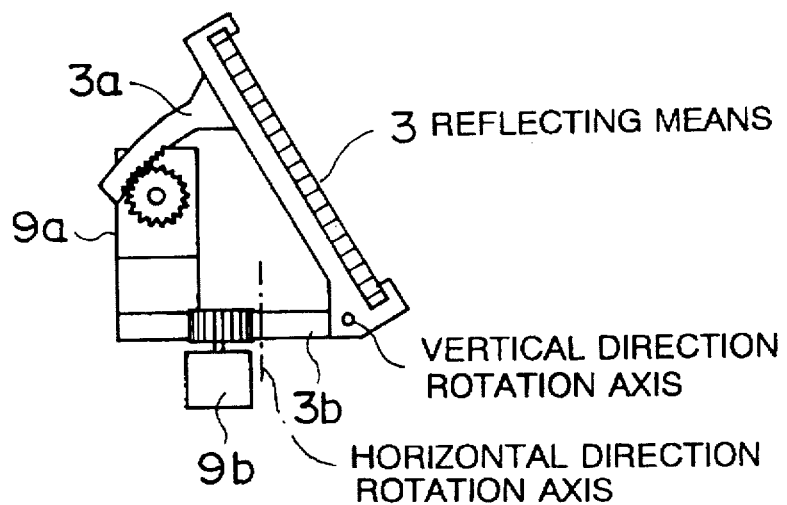
FIG. 8(a) is a side view of the reflecting means and the adjusting mechanism.
Figure 8B:
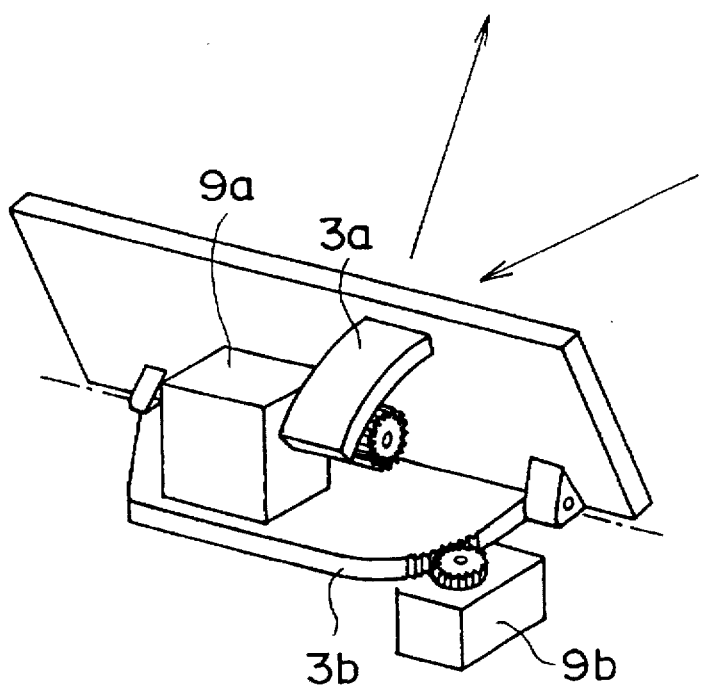
FIG. 8(b) is a perspective view showing them from the back side.

Hereupon, the reflecting means 3 and the adjusting mechanism 9 are constructed as shown in FIG. 8. Namely, the adjusting mechanism 9 has a stepping motor 9a for adjusting a vertical direction which rotates the reflecting means 3 to the vertical direction, when the vertical direction positions of the position of the driver's eyes and the central position of the photographing range differ, and a stepping motor 9b for adjusting a horizontal direction which rotates the reflecting means 3 to the horizontal direction, when the horizontal direction positions of the central position of the range of visibility and the central position of the photographing range differ. Besides, a rotation axis of each motor is provided with a pinion.

Further, the reflecting means 3 has a vertical direction maintenance base 3a and a horizontal direction maintenance base 3b, and the vertical direction maintenance base 3a is provided with a rack which is adjacent to the pinion installed on the rotation axis of the stepping motor 9a for adjusting the vertical direction. Besides, the horizontal direction maintenance base 3b is provided with a rack which is adjacent to the pinion installed on the rotation axis of the stepping motor 9b for adjusting the horizontal direction.

Figure 9:
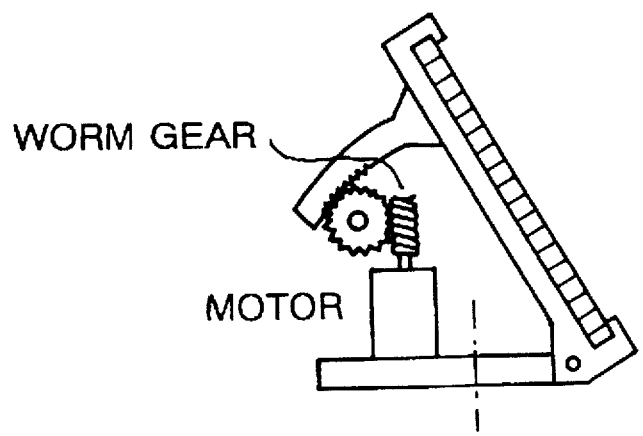
FIG. 9 is a diagram (2) indicating reflecting means and an adjusting mechanism of the embodiments.

Further, as shown in FIG. 9, an ordinary motor can be substituted for the stepping motor 9a for adjusting the vertical direction and the stepping motor 9b for adjusting the horizontal direction by using a worm gear.

As mentioned hereinbefore, according to the present embodiment, the range of visibility can be adjusted automatically so as to be directed to the eyes of the driver 20, even if the driver 20 changes his posture and he is switched to another driver.

Besides, according to the present embodiment, the substantial range of visibility of the head-up display optical system can be limited, and accordingly the optical unit of the head-up display can be miniaturized, since the display position of the informations concerning vehicles can be changed in accordance with the position of the eyes of the driver 20. Besides, the head-up display whose ratio of the area of the displayed image against the display area of the informations is large can be realized, since the substantial range of visibility of the optical system is limited.

Further, the display device of the present embodiment has to operate even at night, and has to photograph the driver clearly even in the dark. The driver 20 will have difficulty in looking at the outside sight, if the interior light of the car is switched on so as to photograph the driver 20. Accordingly, it is necessary to photograph the driver 20 by using such invisible lights as the infrared light. For this reason, in the present embodiment, the element which permeates the display light and reflects the infrared light is used for the spectral means 4, and the photographing camera 5 which is sensitive to the infrared light is used. The multilayer film mirror and the like are used as the spectral means 4.

Besides, all of the reflecting elements on the way of the optical path from the spectral means 4 to the combiner 6 have to possess a characteristic for reflecting the infrared light in high efficiency. The ordinary metalized film mirror possesses a sufficient reflecting rate necessary for reflecting the infrared light, and the metalized film mirror is used as the reflecting element within the optical units except the spectral means 4.

On the other hand, it is not only necessary to reflect the display light and the infrared light, but it is also necessary to make the forward sight visible through the combiner 6 in reference to the combiner 6. For this reason, the multilayer film mirror, the hologram and the like are used as the combiner 6.

Then, when a shortage of exposure is detected due to the reduction of contrast difference of the photographed pictures at the time of photographing, the driver 20 can be photographed without lighting up the indoor of the car if such lightings as the infrared light LED is used. The infrared light used for the photographing does not only have to be invisible, but it also has to be able to photograph the eyes through the driver's spectacles. The permeability of some glasses is deteriorated when the wavelength exceeds about 2000 nm. On the other hand, it is desirable that the wavelength area from 750 nm to 2000 nm is used for the infrared light LED for lighting, and it is necessary to use the photographing camera 5 which is sensitive to the wavelength area, since the visibility of human's eyes is almost vanished when the wavelength exceeds 750 nm. The infrared lighting can be arranged within the optical unit, or can be arranged in a position other than the optical unit.

(The Second Embodiment)

Figure 10:
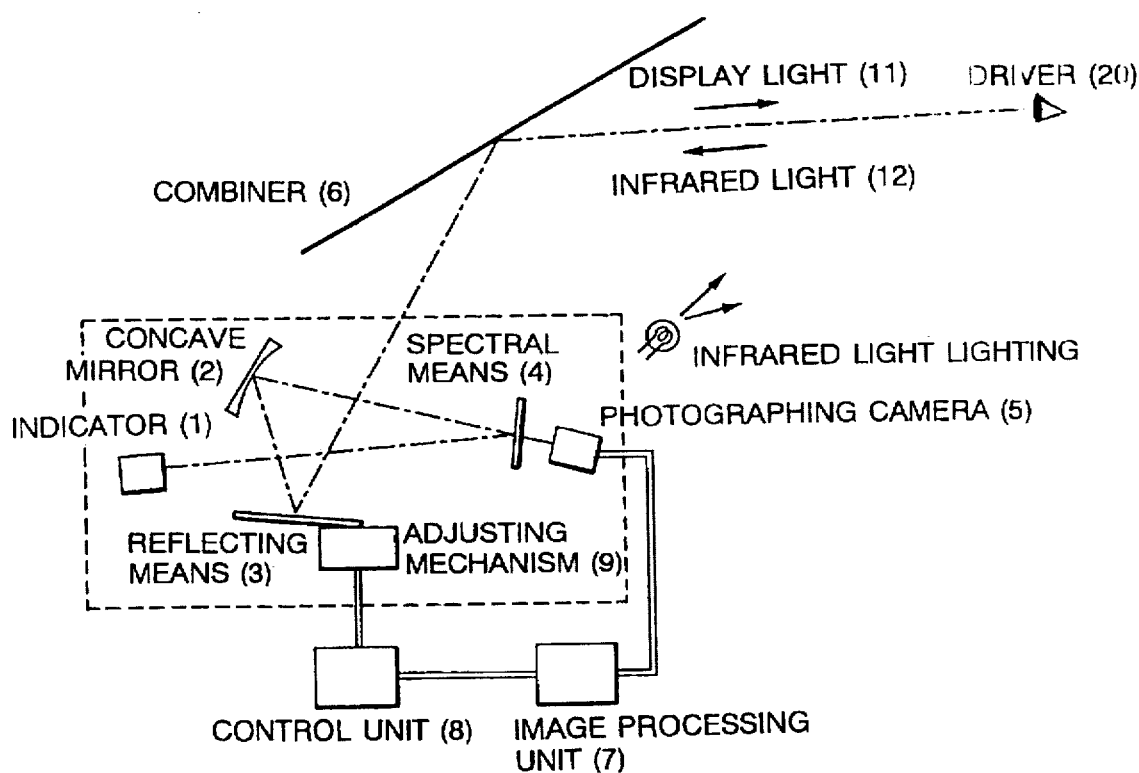
FIG. 10 is a construction diagram of the second embodiment.

The second embodiment is an example in which the multilayer film mirror which permeates the infrared light and reflects the display light as the spectral means 4 is used, and the display device having the same functions as the first embodiment is realized by replacing above-mentioned display element 1 with the photographing camera 5 and arranging it for the spectral means 4. The construction of the second embodiment is shown in FIG. 10. In FIG. 10, each component has the same function as the first embodiment.

(The Third Embodiment)

Figure 11:
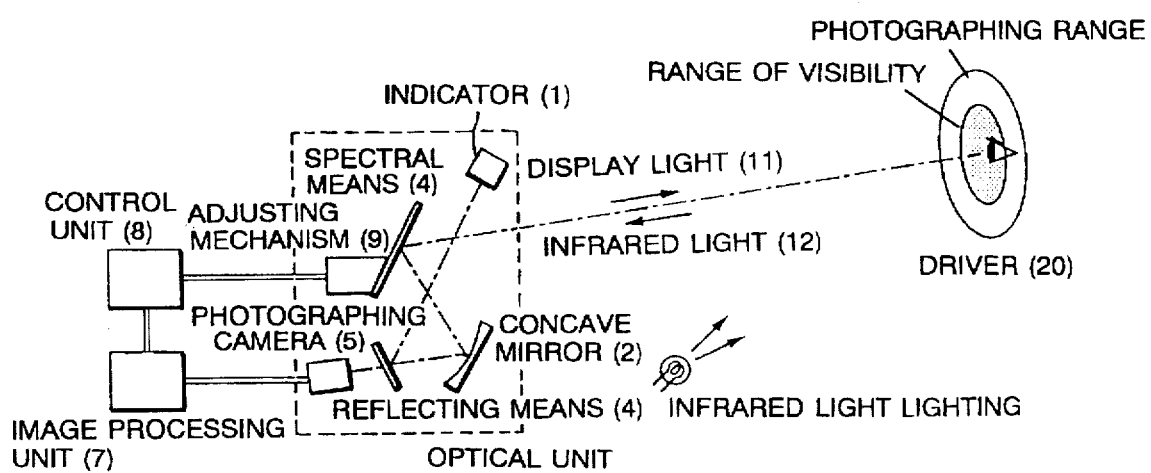
FIG. 11 is a construction diagram of the third embodiment.

FIG. 11 is an embodiment in which the present invention is applied to the distal visual point instrument panel.

Like the first embodiment, the optical system comprises an indicator 1 for displaying informations concerning vehicles, a concave mirror 2 for imaging the display in the distant position, reflecting means 3 whose direction can be adjusted by an adjusting mechanism 9, spectral means 4 for permeating a display light and reflecting a infrared light and a photographing camera 5 for photographing a driver 20 by using the infrared light.

The display light 11 generated from the indicator 1 arrives at the driver 20 after being reflected by the spectral means 4, the concave mirror 2 and the reflecting means 3 respectively. The pictures to be observed are imaged by the concave mirror 2 within the optical unit in the position distant from the driver 20. Hereupon, the reflecting means 3 only has to be able to adjust an outgoing direction of the light, namely, the elements provided with the functions of the concave mirror having an imaging characteristic and a diffraction grating can be substituted for the reflecting means 3.

The spectral means 4 is arranged so that an optical axis of the photographing camera 5 and an optical axis of the display light 11 will be overlapped one another, and permeates the infrared light 12 which is reflected from the driver 20 and proceeds the same optical path as the display light 11 reversely to inject it into the photographing camera 15. Accordingly, the range in which the middle of the range of visibility is regarded as a center is photographed by the photographing camera 5. Besides, the photographing camera 5 is capable of photographing the range which is wider than the range of visibility, since the photographing camera 5 is arranged in the position where the optical path length from an outgoing entrance of the display light is shorter than the indicator 1. The lighting of the infrared LED is installed within the room of the car so as to photograph the driver 20 even in the dark. The present infrared lighting also can be arranged within the optical unit.

In the image processing unit 7, the eyes of the driver 20 are extracted from the pictures photographed by the photographing camera 5 to detect a deviation of position from the center of the photographing range.

The control unit 8 controls the adjusting mechanism 9 on the basis of the deviation of position of the eyes and sets up the direction of the reflecting means 3 so that the driver's eyes will be in a position which is adjacent to the center of the photographed pictures. By these actions, the range of visibility can be directed to the position of eyes of the driver 20 automatically.

According to the present device, the range of visibility can be adjusted automatically so as to be directed to the position of eyes of the driver 20, even if the driver 20 changes his posture and he is switched to another driver. Further, the substantial range of visibility of the optical system can be limited by installing an automatic adjusting mechanism of the above-mentioned range of visibility, and accordingly the optical system of the distal visual point instrument panel can be miniaturized. Further, the distal visual point instrument panel whose ratio of the area of the displayed picture against the displayed area of the informations is large can be realized.

(The Fourth Embodiment)

Figure 12:
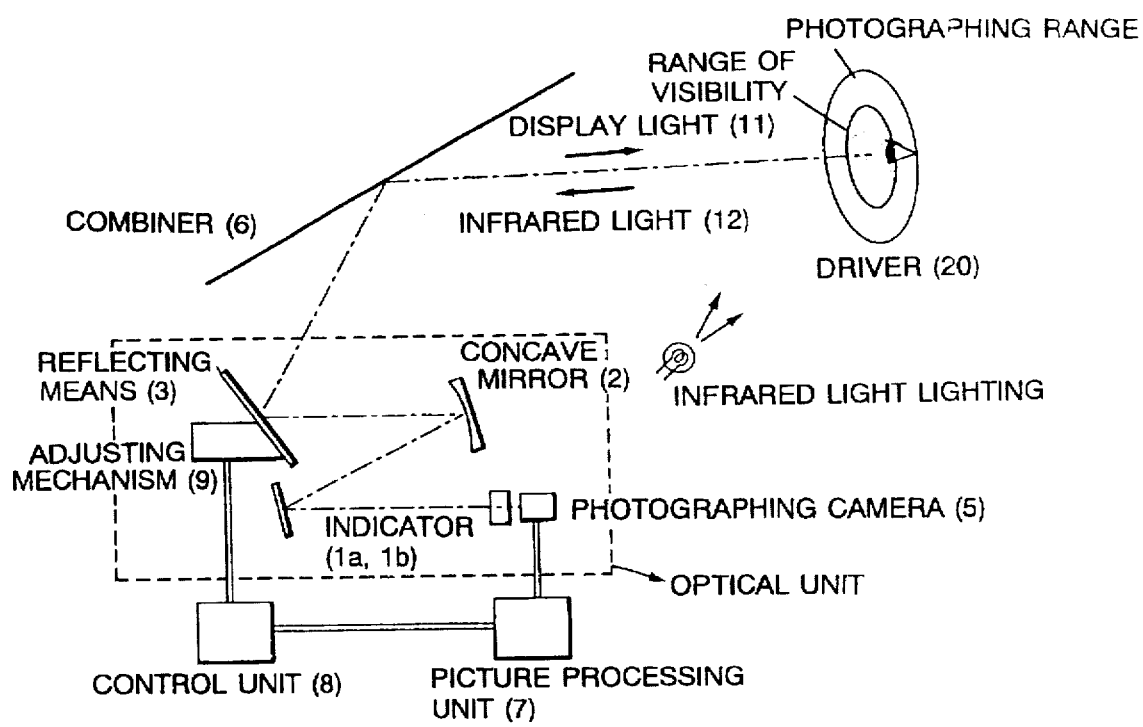
FIG. 12 is a construction diagram of the fourth embodiment.
Figure 13:
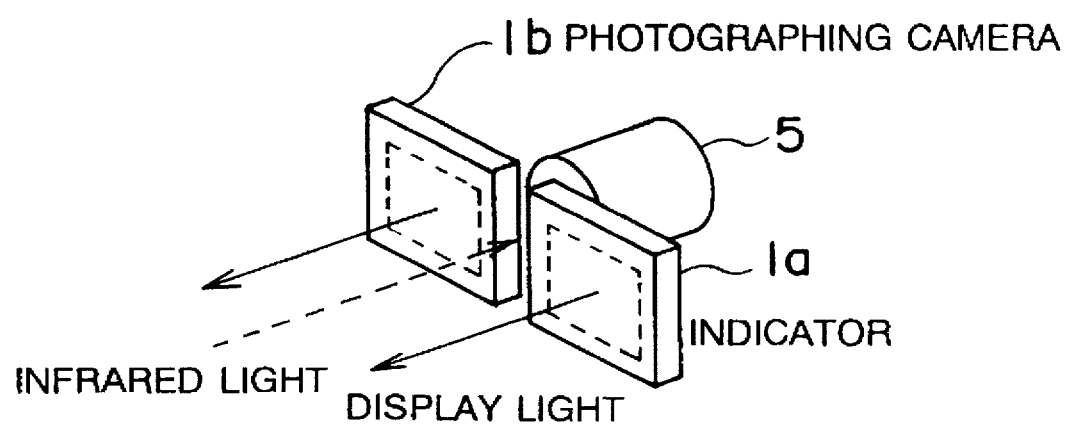
FIG. 13 is a diagram indicating a photographing camera and an indicator in the fourth embodiment.

FIG. 12 is a construction diagram of the fourth embodiment. The fourth embodiment is an example in which the spectral means 4 is made needless by dividing the indicator 1 into two indicators 1a and 1b which are adjacent to one another and arranging the photographing camera 5 between the indicator 1a and the indicator 1b in the first embodiment, as shown in FIG. 13.

Hereupon, the method for displaying the informations will not be changed, even if the indicator 1 is divided into two indicators 1a and 1b which are adjacent to one another. Namely, the pictures of the right half of the indicator 1 will be displayed on the indicator 1a, and the pictures of the left half of the indicator 1 will be displayed on the indicator 1b, that is all.

Then, the center of the photographing range will be regarded as the center of the range of visibility like the first embodiment, since the optical axis of the display light 11 conforms with the optical axis of the photographing camera 5. Accordingly, in the fourth embodiment, the same operations as those of the first embodiment are executed.

(The Fifth Embodiment)

Figure 14:
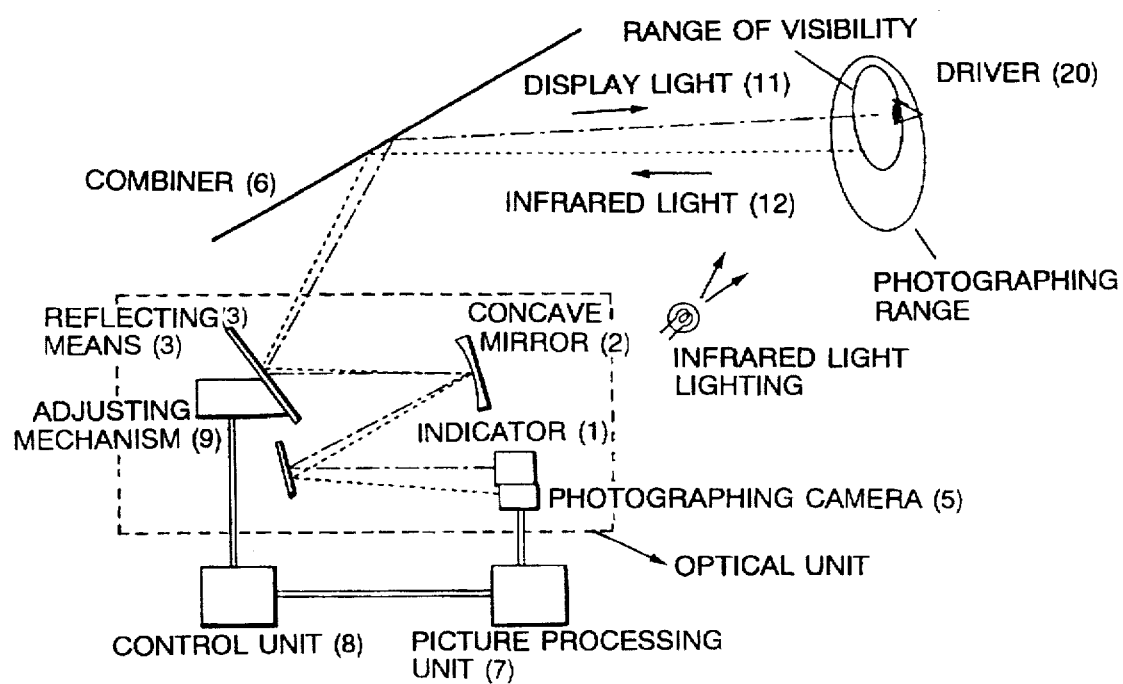
FIG. 14 is a construction diagram of the fifth embodiment.
Figure 15:
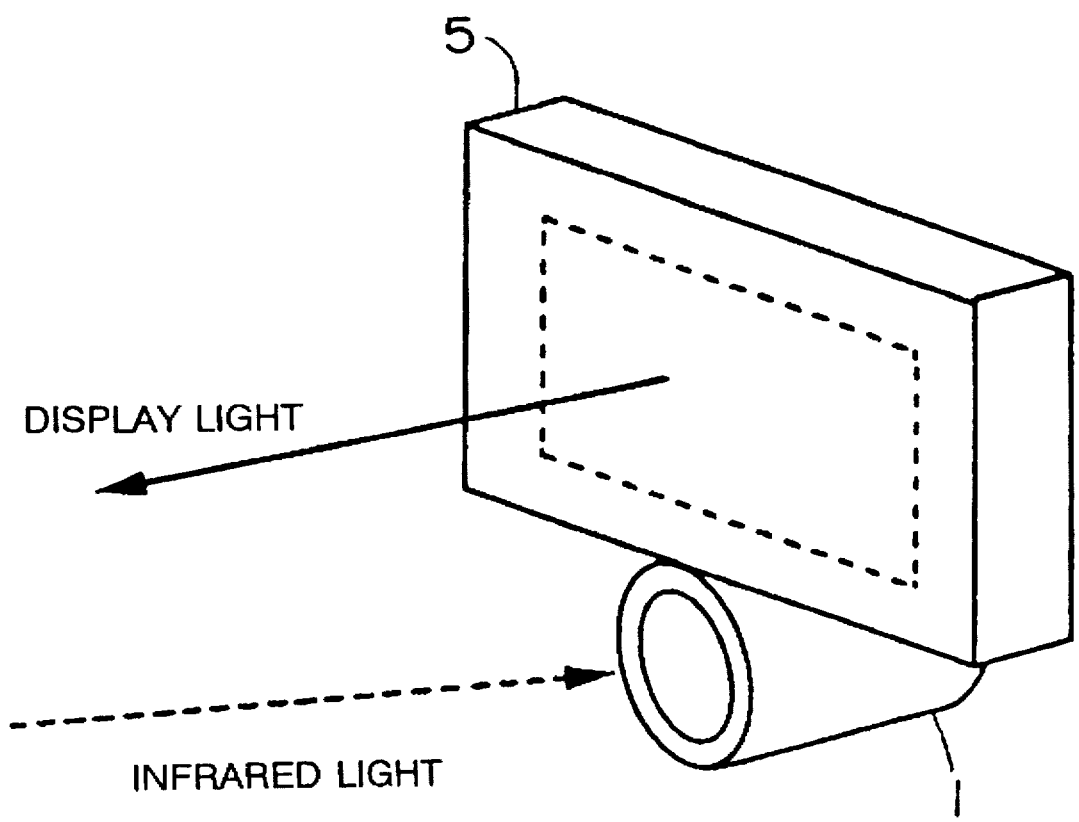
FIG. 15 is a diagram indicating a photographing camera and an indicator in the fifth embodiment.

FIG. 14 is a construction diagram of the fifth embodiment. The fifth embodiment is an example in which the spectral means 4 is made needless by arranging the photographing camera 5 on the lower side of the indicator 1 in the first embodiment, as shown in FIG. 15.

Figure 16:
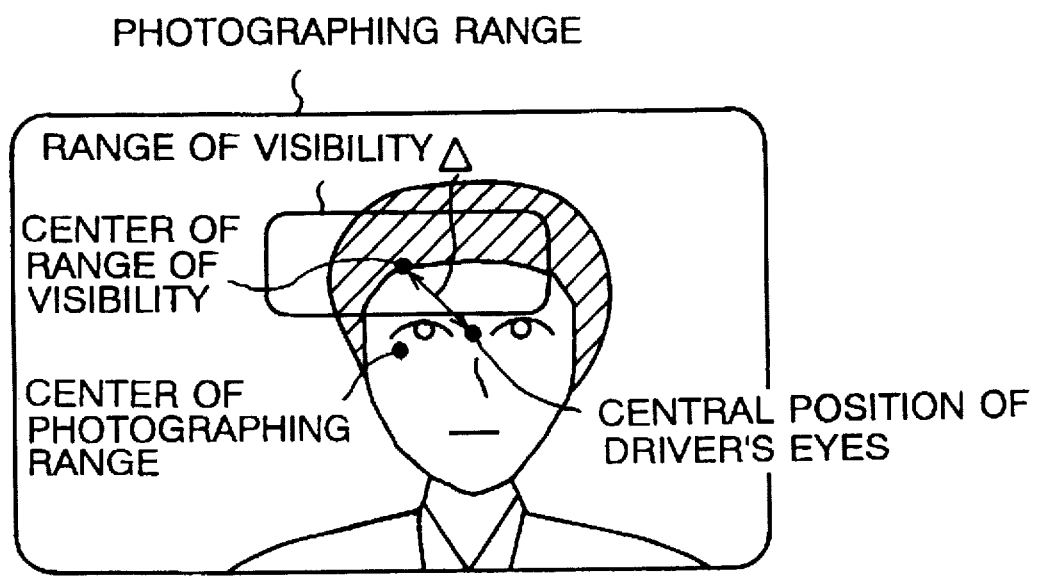
FIG. 16 is a diagram indicating pictures photographed by the photographing camera in the fifth embodiment.

Hereupon, as shown in FIG. 16, the center of the photographing range will be deviated from the center of the range of visibility, since the photographing camera 5 is arranged on the lower side of the indicator 1. For this reason, the image processing unit 7 detects a deviation A of the position of the eyes of the driver 20 from the center of the range of visibility which has been assigned previously, and the adjusting mechanism 9 adjusts the direction of the reflecting means 3 on the basis of the deviation A. Further, the deviation A has components of the horizontal direction and the vertical direction, and the adjusting means 3 drives the stepping motor 9b for adjusting the horizontal direction and rotates the horizontal direction maintenance base 3b for the deviation Δ of the horizontal direction. On the other hand, the adjusting means 3 drives the stepping motor 9a for adjusting the vertical direction and rotates the vertical direction maintenance base 3a for the deviation A of the horizontal direction.

What is claimed is:

1. A display device which displays information concerning vehicles by forming a virtual image of the information in front of a driver, comprising:

an indicator for displaying the information;

an optical system forming the virtual image of the information displayed on the indicator in front of the driver by transferring light emitted from the indicator through a projecting light path, said optical system including a deflector which deflect the projecting light path;

a photographing unit for photographing the driver by use of light transferred through a photographing light path;

an optical element positioned between the indicator and the deflector which combines the projecting light path with the photographing light path into common light path extending toward the driver;

an image processing unit for detecting a position of the driver from pictures photographed by said photographing unit; and an adjusting mechanism for adjusting a deflection angle of the common light path due to the deflector so that the light is incident on an eye of the driver, on the basis of the position of the driver detected by said image processing unit.

2. A display device according to claim 1, including:

a combiner which is installed on front window of the vehicles and reflects the light transferred through the projecting light path to form the virtual image of the informations outside the front window.

3. A display device which displays informations concerning vehicles by imaging the information on a forward view of a driver, comprising:

an indicator for displaying informations concerning the vehicles;

a photographing unit for photographing the driver;

an image processing unit for detecting a position of the driver from pictures photographed by said photographing unit;

an adjusting mechanism for adjusting an angle of reflecting means which reflects a display light emitted by the indicator on the basis of the position of the driver detected by said image processing unit; and spectral means for permeating the display light and reflecting a light which has arrived from a side of the driver, wherein said photographing unit photographs the driver by using the light reflected by said spectral means.

4. A display device which displays informations concerning vehicles by imaging the information on a forward view of a driver, comprising:

an indicator for displaying informations concerning the vehicles;

a photographing unit for photographing the driver;

an image processing unit for detecting a position of the driver from pictures photographed by said photographing unit;

an adjusting mechanism for adjusting an angle of reflecting means which reflects a display light emitted by the indicator on the basis of the position of the driver detected by said image processing unit; and spectral means for reflecting the display light and permeating the light which has arrived from the side of the driver, wherein said photographing unit photographs the driver by using the light permeated by said spectral means.

5. A display device according to claim 1, wherein said image processing unit detects the position of the driver's eyes from the pictures photographed by the photographing unit; and said adjusting mechanism adjusts the deflection angle of the common light path due to the deflector so that the light is incident on eye of the driver, on the basis of the position of the driver's eyes detected by the image processing unit.

6. A display device which displays informations concerning vehicles by imaging the information on a forward view of a driver, comprising:

an indicator for displaying informations concerning the vehicles;

a photographing unit for photographing the driver;

an image processing unit for detecting a position of the driver from pictures photographed by said photographing unit; and an adjusting mechanism for adjusting an angle of reflecting means which reflects a display light emitted by the indicator on the basis of the position of the driver detected by said image processing unit;

wherein the indicator is composed of a pair of display components which are adjacent to each other; and wherein said photographing unit is positioned in the middle of the display components of the indicator.

7. A display device which displays information concerning vehicles by forming a virtual image of the information in front of a driver, comprising:

an indicator for displaying the information;

an optical system forming the virtual image of the information displayed on the indicator in front of the driver by transferring light emitted from the indicator through a projecting light path, said optical system including a deflector which deflect the projecting light path;

a photographing unit illuminating the driver with an infrared light and photographing the driver by use of the infrared light reflected by the face of the driver;

an image processing unit for detecting a position of the driver from pictures photographed by said photographing unit; and an adjusting mechanism for adjusting an deflection angle of the projecting light path due to the deflector so that the light is incident on eye of the driver, on the basis of the position of the driver detected by said image processing unit.

8. A display device according to claim 3 or 4, wherein said photographing unit photographs a face of the driver by using the infrared light;

said image processing unit detects the position of the driver's eyes from the pictures photographed by the photographing unit; and said adjusting mechanism adjusts the angle of said reflecting means which reflects the display light emitted by the indicator on the basis of the position of the driver's eyes detected by the image processing unit.

* * * * *